United States Patent [19]

Barba et al.

[11] 4,030,985

[45] June 21, 1977

[54] APPARATUS FOR DESALTING SALINE WATER

[75] Inventors: Diego Barba; Antonino Germanà; Giuseppe Liuzzo; Giovanni Tagliaferri, all of Rome, Italy

[73] Assignee: Societa' Italiana Resine S.I.R. S.p.A., Milan, Italy

[22] Filed: Dec. 17, 1975

[21] Appl. No.: 641,474

[30] Foreign Application Priority Data

Dec. 20, 1974 Italy ................................. 30811/74

[52] U.S. Cl. ............................. 202/174; 202/236; 203/11; 203/26; 203/89; 159/18

[51] Int. Cl.² ...................... B01D 3/02; B01D 3/00; B01D 1/26

[58] Field of Search .................. 203/10, 11, 24, 26, 203/89; 202/174, 236; 159/17, 18

[56] References Cited

UNITED STATES PATENTS

| | | |
|---|---|---|
| 3,021,265 | 2/1962 | Sadtler et al. ...................... 202/174 |
| 3,165,435 | 1/1965 | Henszey ............................ 203/26 X |
| 3,356,125 | 12/1967 | Standiford ....................... 202/174 X |
| 3,481,835 | 12/1969 | Carnavos ............................ 202/174 |
| 3,503,433 | 3/1970 | Riva et al. ............................ 203/26 |
| 3,875,988 | 9/1975 | Machida et al. ................ 202/174 X |

*Primary Examiner*—Jack Sofer
*Attorney, Agent, or Firm*—Sughrue, Rothwell, Mion, Zinn & Macpeak

[57] ABSTRACT

Saline water is desalted by flowing it in two evaporation stages in series in the form of a film falling on the inside of heat-exchange tubes. The pressure and temperature in the second evaporation stage are lower than in the first stage. The steam evolved in the second stage is compressed and delivered to the first stage where it condenses on the tubes, whereas the steam evolved in the first stage is fed in the second stage where it condenses on the tubes. The condensation heat of the steam is used for vaporizing said saline water from said film. This technique allows a production of 15–50 cu.m/hr of soft water, instead of a production of 15–20 cu.m/hr usually obtained by conventional thermocompression techniques.

7 Claims, 3 Drawing Figures

APPARATUS FOR DESALTING SALINE WATER

The present invention relates to a process and apparatus for desalting saline water, such as sea water, by evaporation.

A widely used technique for desalting saline water is the thermo-compression technique.

In such a technique, saline water is caused to flow on a heat-exchange surface; the temperature of the steam produced in this manner is increased by means of a compressor and the compressed steam is used to heat the said heat-exchange surface by yielding to the latter its condensation heat. The condensate is recovered and provides the desired product, that is soft water.

The only external source of energy used in such a technique is that which feeds the compression- and the servicing pump motors.

Several processes have been proposed which utilize the thermocompression technique, which is very advantageous because of the high grade of the desalted water, the compactness and ease in operating of the plants.

The thermocompression technique, however, presents a remarkable limit in so far that it finds an application only in plants of small potentiality, intended therefore to satisfy rather restricted water requirements.

In practice, with the conventional thermocompression plants, the maximum potentialities attained are usually of the order of 15-20 cu.m/hr of desalted water, because above these values very large compressors and tube plates are required, a fact which affects unfavorably both the investment- and the operating costs.

In realizing plants of high potentiality, the multiple expansions technique is that most used.

According to this technique the desalting action relies upon the expansion whereto is submitted the saline solution (brine), which flows through a series of evaporation stages. Each of said stages is maintained at a pressure lower than that of the preceding one. Following each pressure drop the solution, in order to attain again equilibrium, cools itself developing steam.

The steam formed condenses on a heat-exchange surface and the condensate is collected so as not come into contact with the saline solution.

The multiple expansion technique permits to realize plants affording potentialities of the order of 1000-2000 cu.m/hr, a fact which allows to reduce remarkably the incidence of the initial investment. These plants present furthermore the advantage of the simplicity in operating and of the high grade of the water produced.

The multiple expansion plants, besides being used for high potentialities of desalted water, may be used also for medium potentialities. The size of plants of this type, and therefore their non-negligible investment cost, makes instead economically too disadvantageous their utilization for potentialities of desalted water lower than 50 cu.m/hr.

Actually of the plants utilizing other techniques none is in a position of satisfying in an economical and advantageous way the water requirements in the field ranging from 15 to 50 cu.m/hr. As a matter of fact two or more thermocompression plants are generally used to satisfy these requirements.

An object of the present invention is a process for desalting saline waters which allows to satisfy in an economic and advantageous way water requirements of at least 10 cu.m/hr and more particularly from 15 to 50 cu.m/hr.

A further object of the present invention is an apparatus for carrying out this process.

The invention provides a process for desalting saline water by evaporation in two evaporation stages in series, characterized in that the second stage is maintained at a lower pressure and temperature than the first stage, the evaporation occuring in each of said stages by means of the condensation heat of the steam coming from the other stage; the saline water is flowed in the first evaporation stage in the form of an annular thin film falling on the inside of vertical tubes; said saline water is partially vaporized from said film by condensation on the outside of said vertical tubes, of compressed steam coming from the second stage; the steam evolved in said vertical tubes and the residual saline water (brine) are collected and separated at the outlet of said tubes; the brine is flowed in the second evaporation stage in the form of an annular thin film falling on the inside of vertical tubes; the steam evolved is introduced in said second stage on the outside of said vertical tubes; the brine is partially vaporized from said film by condensation of said evolved steam on the vertical tubes; the steam evolved in said tubes of the second stage and the residual brine are collected and separated at the outlet of the tubes; the steam evolved in said second stage is compressed and delivered to the first stage; the distillate obtained by condensation of the steam in said evaporation stages is recovered.

One of the essential aspects of the process of the present invention is constituted by effectuating the water evaporation in two stages, in series between them, which operate at temperatures and pressures maintained at decreasing values.

More precisely the evaporation occurs in the first stage by boiling at a temperature of from 60° to 110° C and preferably from 70° to 80° C while in the second stage by boiling at a temperature of from 50° to 100° C and preferably from 60° to 70° C.

These conditions are achieved by controlling the pressure of the second stage and the compression ratio of the compressor.

As vacuum equipment, vacuum pump- or ejector systems may be indifferently used.

Another essential aspect of the process of the present invention consists of effectuating the evaporation of the brine in the second stage by the condensation heat of the steam coming from the first stage and the evaporation of the saline water in the first stage by the condensation heat of the steam coming from the second stage after compression.

More precisely, the brine enters the inside of the tubes of said second evaporation stage at about the evaporation temperature of the first stage. Due to the lower pressure maintained therein, said brine cools down to a lower evaporation temperature, flushing off steam. The steam developed in the evaporation of the saline water on the inside of the tubes of the first stage is condensed on the outside of the tubes of the second stage, thus releasing its condensation heat to the brine with production of steam.

The steam formed by evaporation of the brine on the inside of the tubes of the second stage, after proper compression is condensed on the outside of the tubes of the first stage and the cycle continues.

As for compressors, equipment of the centrifugal- or rotative type, operated by an electric- or by a diesel motor may be used.

The apparatus for carrying out the process of the invention will now be described with reference to the accompanying drawings, wherein.

The feeding of the saline water or of the brine in the form of an annular and thin film falling on the inside of the vertical tubes, respectively, of the first and second stage may be advantageously brought about by means of the distribution system already described in patent to Barba et al. No. 3,997,408, granted Dec. 14, 1976 and shown in FIG. 2.

Figure 2:
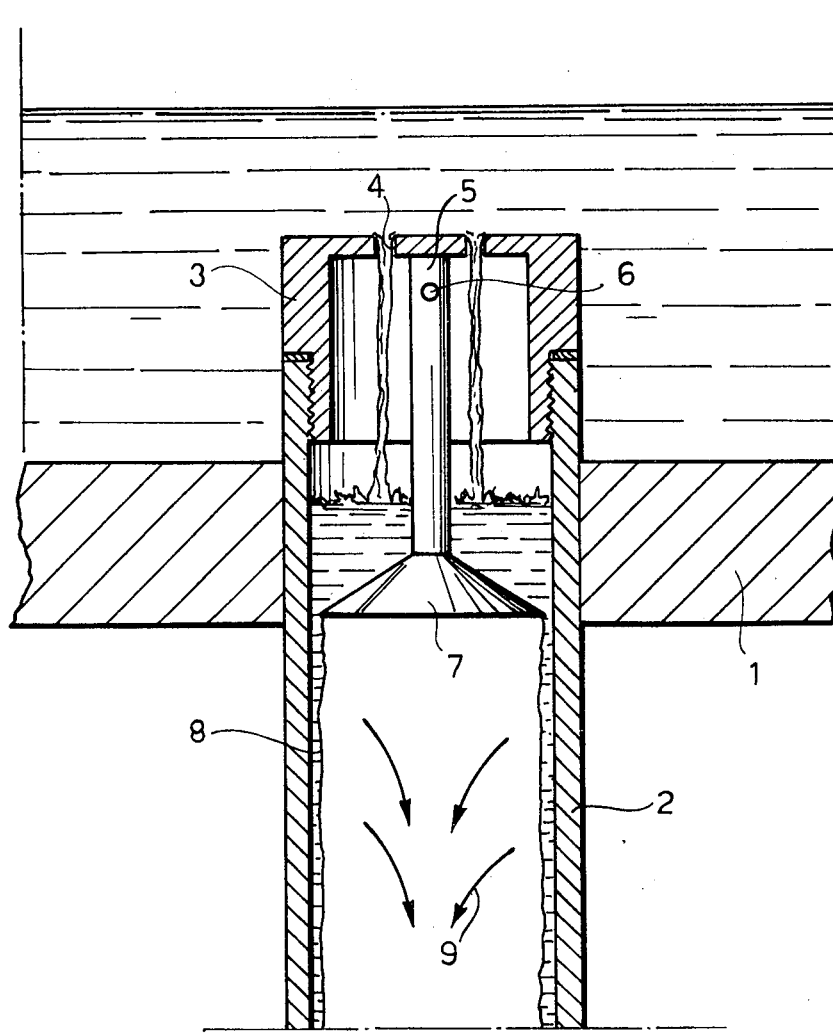
FIG. 2 is a schematic enlarged view of a preferred distribution system for feeding saline water on the inside of a tube of the apparatus of FIG. 1.

With reference to FIG. 2, the water to be desalted is introduced in the chamber standing above the header plate 1 wherefrom the tubes 2 are protruding. Each tube is covered by a cap 3, on the top whereof are drilled from two to four holes 4. A tubular stem 5, wherein some holes 6 are drilled, is fixed in the underlaying part of the cap.

In the lower part of the stem is welded a frusto-conical roof member 7 whose maximum diameter is such as to leave with respect to the tube 2 an annular space of thickness ranging from 0.5 to 2 mm.

The water penetrates through the holes 4 and forms a pool above the roof member, percolating as a thin film 8 along the tube 2 and releasing steam 9. The holes 6 form vent apertures ensuring the equilibration of the pressure between the core of the stem and the zone overlaying the roof member, where the pool is forming.

As tubes, those used normally as heat-exchange surfaces in the tube bundle type exchangers may be utilized.

Also, more advantageously, tubes with a double grooved internal and external surface may be used and especially the so called fluted tubes having a nominal diameter of from 50 to 100 mm.

By the adoption of the fluted tubes, exchange coefficients about double, as compared to the case in which smooth tubes are used, can be attained.

The problem relative to the accumulation in the condensation chambers of uncondensable gases may also be solved very advantageously according to what has been already described in Barba et al. patent No. 3,997,408 hereinbefore mentioned.

The presence of these uncondensable gases, in particular nitrogen, oxygen and carbon dioxide, is mainly due to the development of same from the water to be desalted during the evaporation stage and to the unavoidable entry of small amounts of air on the inside of the evaporation and condensation zones, because the seal of the gaskets is not always perfect.

The accumulation of the uncondensables brings forth very serious drawbacks, in particular lowerings, sometimes very intense, of the heat-exchange coefficient and thus of the yield and remarkable increases in the corrosion.

Unavoidably some steam always accompanies the uncondensables withdrawn.

Figure 3:
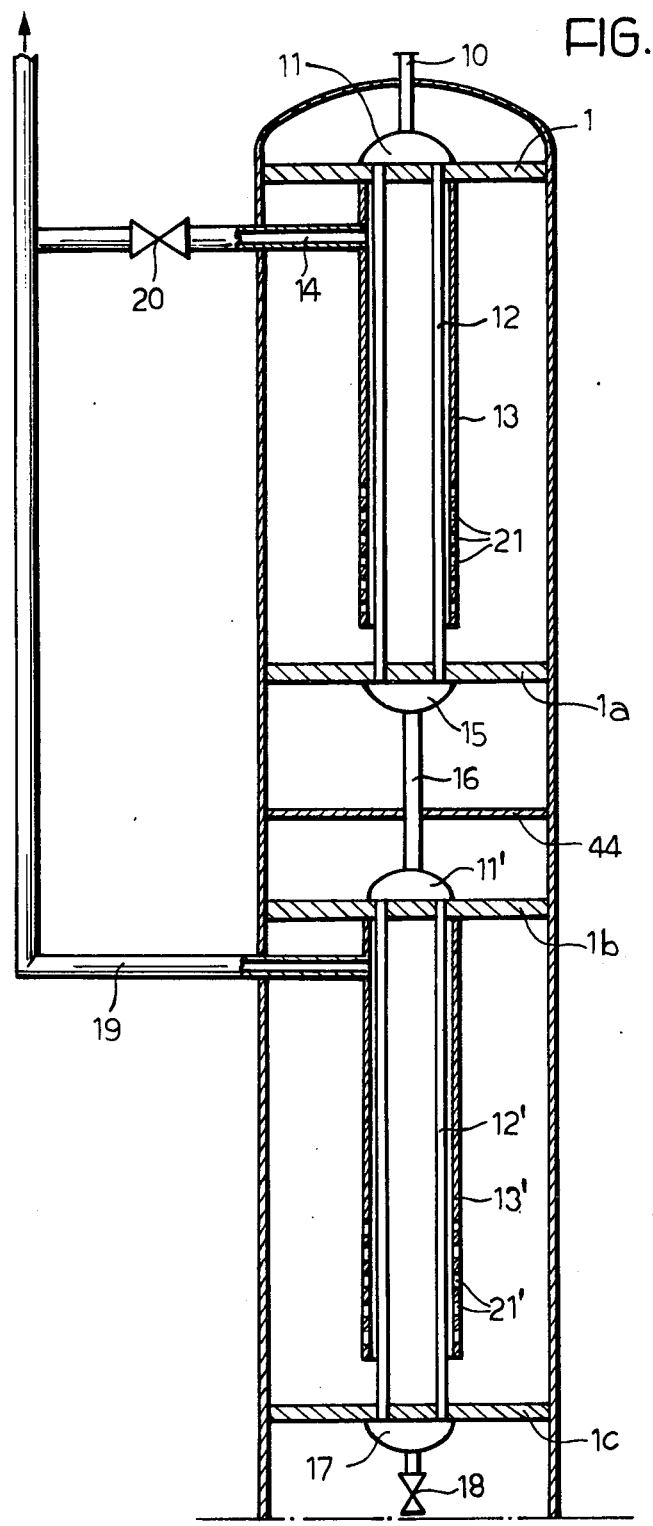
FIG. 3 is a schematic view of a drainage system for removing uncondensable gases from the evaporation section of the apparatus of FIG. 1.

FIG. 3 shows a preferred drainage system for the uncondensables which is analogous in functioning to that described in the Barba et al. patent No. 3,997,408 with the variant, in the present case, that it is applied to both evaporation stages.

In particular the uncondensable gases are submitted to intensive cooling on the inside of the two stages before being sucked by a vacuum equipment.

For this purpose, each evaporation stage comprises a tubular element for collecting the uncondensable gases, riddled in its lower part and laterally connected at its upper end to the vacuum equipment, said element being internally provided with cooling elements.

This tubular element is disposed coaxially with respect to the bundle of evaporation tubes, preferably on the axis of said bundle and it contains one or more cooling elements, preferably regular tubes with a diameter ranging from 20 to 25 mm, through which cold saline water is allowed to flow.

In the preferred embodiment the cooling tubes are parallel to the heat-exchange tubes, starting and terminating on the same header plates and are surrounded by the tubular element for collecting the uncondensables.

With reference to FIG. 3, the cooling sea water is introduced from the pipe 10 and fed through the distribution pool 11 to the regular tubes 12 placed on the inside of the collector 13 for the uncondensables.

The uncondensables enter said collector through the drainage holes 21 properly prearranged in the part of said collector 13 located in the lower half of the condensation zone 38 and then flow upwardly on the inside of the collector 13, growing cooler, up to the point of the vacuum intake corresponding to the vacuum intake pipes 14 and 19.

The cooling water flowing on the inside of the smooth tubes 12 is collected in the collecting pool 15 and therefrom, through pipe 16 and pool 11, passes to the tubes 12' of the collector 13' of the underlying stage, where the same scheme of the first stage is exactly repeated.

In this manner, both in the first and in the second stage, a cold zone is created on the inside of the collectors, where, passing through the drainage holes 21 and 21' drilled on the relative collectors, the uncondensables gases concentrate; these gases flow upwardly in opposite direction to the cooling water, the upper part of the collector undergoing a further cooling effect and thus a concentration effect.

Finally the elimination of the uncondensable gases thus cooled and concentrated, occurs by suction by the vacuum equipment through the pipes 14 and 19.

The adjustable valve 20 allows to equilibrate the pressures of the fluids conveyed to the sucking device.

The water flowing through the regular tubes 12 and 12' is finally collected in the pool 17 and discharged through the throttling valve 18 in the underlaying reservoir, wherefrom it is conveyed to desalting.

The apparatus for carrying out the process of the invention consists essentially in a vertical, lengthened, tubular shell, containing the vertical tube bundles, asymmetrically connected to a lengthened horizontal base section.

Figure 1:
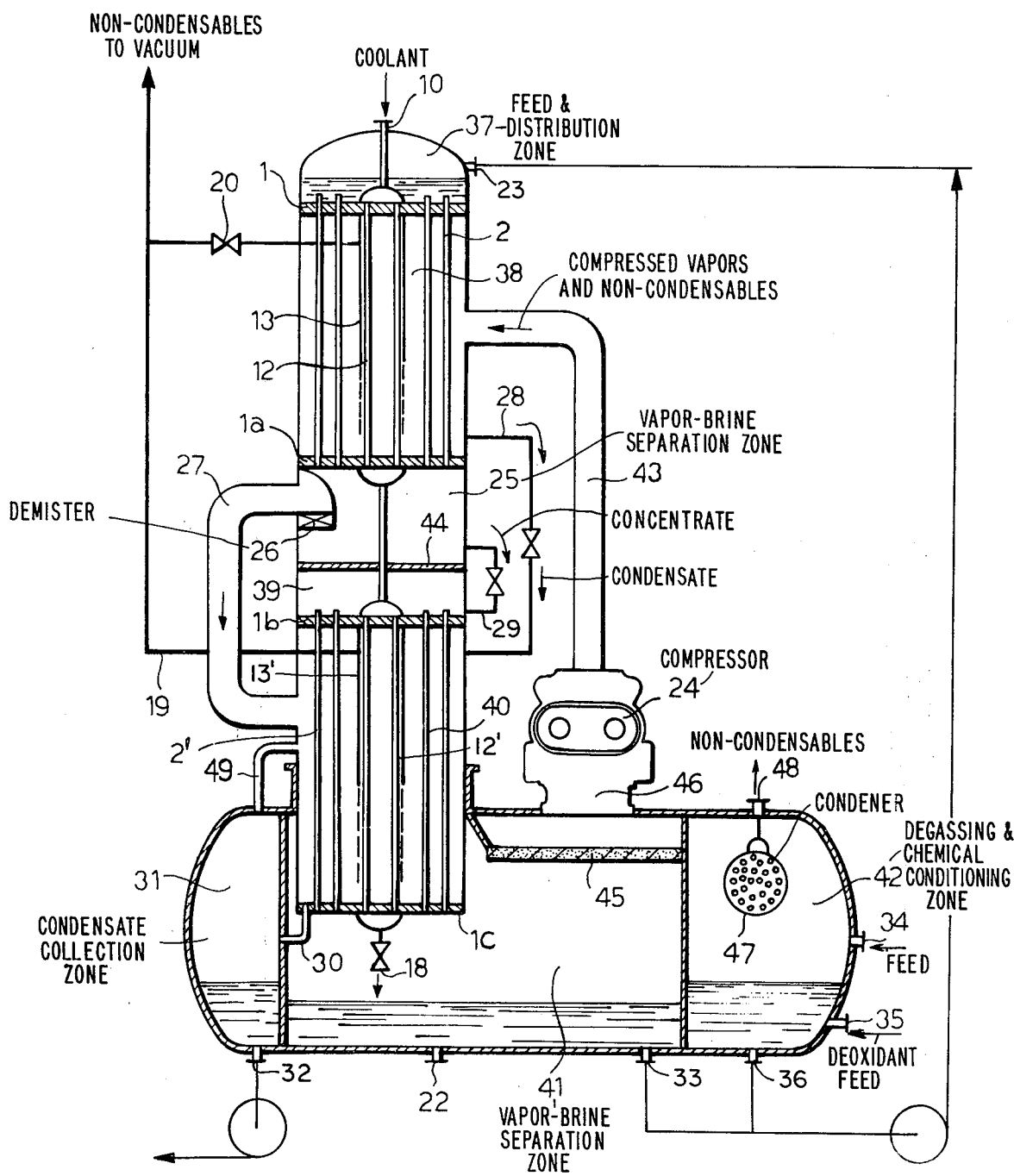
FIG. 1 is a schematic view of an apparatus according to the invention.

FIG. 1 illustrates in detail a preferred embodiment of the desalting equipment according to the present invention.

In particular the equipment in the vertical lengthened, practically cylindrical shell comprises, from the top to the bottom, a first feeding and distribution zone 37 of the water to be desalted, a first evaporation and condensation zone 38, a first zone 25 for the separation of steam from brine, a second feeding and distribution zone 39 of the water to be desalted (brine coming from the first stage), a second evaporation and condensation zone 40; in the lengthened base section it comprises, a collecting zone 31 for the condensate, a central zone 41 for the separation of the steam from the brine, and a zone 42 for the degassing and chemical conditioning of the feeding saline water.

The first feeding and distribution zone, indicated by 37, is the zone comprised between the domed upper endwall wherefrom the pipe 10 for the cooling water feeding rises, and the header plate 1. Therefore this zone comprises the distribution system shown in FIG. 2, and is fed through pipe 23 with the water to be desalted.

The first evaporation and condensation zone 38 is that zone which comprises the whole bundle of vertical exchanger fluted tubes 2 and of coaxial regular cooling tubes 12.

These last are surrounded by the collector 13.

In practice the first evaporation and condensation zone 38 coincides with the zone comprised between the upper header plate 1 and the lower header plate 1a.

The steam entering said zone 38, through the pipe 43, condenses on the tubes 2 and the condensate goes out through the pipe 28 provided with an adjustable throttling valve, without forming any appreciable pool on the lower plate 1a, thus avoiding to render a portion of the thermal exchange tubes 2 useless.

The first zone 25 for the separation of the steam from the brine is that wherein the liquid and the steam, which flow in equicurrent in the tubes 2 comprised in zone 38, separate.

In practice it is the zone which extends between the header plate 1a and the plate 44 and which is connected by means of the pipe 29 through an adjustable throttling valve to the second feeding and distribution zone 39 and by means of the drop separator filter (demister) 26 and pipe 27 to the second evaporation and condensation zone 40.

The second feeding and distribution zone 39, which is that extending from the plate 44 to the header plate 1b, operates substantially like the first corresponding zone 37, providing for the distribution into the bundle of tubes 2', comprised in the second evaporation and condensation zone 40, of the brine coming from the zone 25 through the pipe 29 and an adjustable throttling valve.

Also, the second evaporation and condensation zone 40, which is that comprised between the header plate 1b and the header plate 1c operates substantially like the corresponding first zone 38. The steam coming from the zone 25 through the demister 26 and the pipe 27 condensates on the tubes 2' and the condensate is collected on the upper surface of the header plate 1c and conveyed through the pipe 30 to the collecting zone 31 of the base section.

The second evaporation and condensation zone 38 comprises the bundle of tubes 2' and of regular coaxial cooling tubes 12' surrounded by the collector 13'.

In the base section are performed some functions which are essential for the good results of the process and in particular for the complete separation of the liquid from the steam, the degassing and the chemical conditioning of the feeding saline water and finally the collection of the distilled water.

An efficient separation of the liquid from the steam is of fundamental importance for two reasons: on one hand the dragging of saline water pollutes the steam, on the other hand said dragged water coming into contact with the rotating organs of the compressor may cause corrosion phenomena.

Under this aspect the run of the steam and the disposition of the filtering organs are extremely important.

The possibility of avoid corrosion phenomena and fouling is dependent on an efficient degassing action of the feeding water and to the possibility of adding antiscaling substances to it, allowing to these last the time for reacting chemically. In fact, corrosion is fought by eliminating carbon dioxide and oxygen; the removal of the latter is obtained in two stages; in a first stage together with carbon dioxide during expansion of the solution under vacuum realized in the degassing chamber of the base section and in a second stage by addition of small amounts of deoxidizer, for instance sulfite or hydrazyne. A consequence of the expansion is also the release of carbon dioxide coming from the decomposition of bicarbonates.

On the other hand the water vapor which accompanies the gases released in the expansion, has to be partially condensed if the vacuum section does not have to be uselessly enlarged with a consequent consumption of power and decrease in yield. Therefore in the chamber of the base section used as degassing device, either a tube bundle or a coil through which a portion of the cold feeding water is passing, is introduced. The mixture of gases and vapors passing through said bundle or coil rises its concentration of uncondensables and then is sucked by the vacuum system.

The cooling water passes directly in the degasser where it reunites with the feeding undergoing itself a degassing effect.

A last function which is entrusted to a separating zone of the base section is that of acting as an accumulator of condensates. That constitutes an important advantage for two reasons: on one hand the total elimination of the distillate from the tube bundle prevents the formation of appreciable pools of liquid on the header plates, thus avoiding to render useless a lower portion of the exchange surface, which is the greater the higher is the above mentioned pool; on the other hand, the stay time in the soft water reservoir permits to perform the addition of the salts necessary to the water potability with no need of further apparatuses and pumps.

With reference to FIG. 1, the steam outflowing from the tubes 2', of the second evaporation and condensation zone 40 in the inside of the separation zone of the steam from the brine 41 makes a long run with a twofold inversion of direction and a strong decrease of velocity, a fact that ensures an optimum release of the draggings; said release is completed by passage through the drop separator filters (demisters) 45. The thus purified steam enters through the pipe 46 into the compressor 24 and thus compressed, is delivered through the pipe 43 in the first evaporation and condensation zone 38.

The concentrated brine, separated from the steam in zone 41 accumulates on the bottom of this zone and is extracted by a recycling pump through the outlet 33 and by a discharge pump through the outlet 22.

The saline water enters the degassing- and chemical conditioning zone 42 via pipe 34, said zone being maintained under moderate vacuum. The gas and the steam evolved, reach the tube bundle or the coil 47 where a partial condensation occurs and the uncondensed fraction is removed by suction through the pipe 48.

In practice the expansion in zone 42 is controlled in such a manner that the water will cool by 1°–2° C.

The deoxidant for the total elimination of oxygen is introduced through the pipe 35 while the degassed and chemically conditioned water, which constitutes the refill, is withdrawn through the pipe 36, and delivered by pumping, together with the recycling current extracted through pipe 33, into the pipe 23 and therefrom to the first feeding and distribution zone 37.

Finally the condensate, coming from the second evaporation and condensation zone 40, passes in the collecting zone 31 of the bottom collector, through the pipe 30, without formation of any appreciable condensate pool on the header plate 1c. The condensate is withdrawn from zone 40 by pumping through the pipe 32. The connection pipe 49 ensures the equilibration of the pressure and the initial elimination of the uncondensables.

All the heat-exchange surfaces are made of non-ferrous alloys, in particular copper-nickel or aluminum brass alloys are preferred for the heat-exchange tubes. The preferred material for the header plates is brass of the naval brass type.

The mantle surrounding the bundles, that is the vertical elongated part is made of common steel, while the bottom collector can be realized in stainless steel plated with copper based alloys or with stainless steel; a preferred solution is that envisaging the use of fiber glass reinforced polyester resins for the construction of the collector.

In summing up, the process of the present invention is performed in this manner: treated and degassed saline water coming from zone 42 through pipe 36 and the recycle brine coming from zone 41 through pipe 33, are delivered through pipe 23 to the higher pressure and temperature stage.

The water flows along the tubes 2 where it receives heat from the steam coming from the subsequent underlaying stage, after compression in the compressor 24. Liquid and steam flow in equicurrent in the tubes and separate in the zone 25.

The steam thus formed is fed through the demister 26 and the pipe 27 into the underlaying stage at lower pressure and temperature, where it constitutes the heating means.

Through the pipe 28 fitted with an adjustable throttling valve the condensate of the first stage is also introduced on the inside of the second stage, while the brine outflowing from the first stage is delivered to the second stage through the pipe 29 fitted with an adjustable throttling valve.

Through the pipe 30 the condensate of both stages are discharged in the zone 31 of the bottom collector, wherefrom they are pumped through the pipe 32 to be conveyed to the thermal recovery and then to the utilization.

A part of the brine is discharged through pipe 22, while through 34 and 35 are let in respectively the refill, to be degassed and conditioned, and the deoxidant.

By desalting saline water according to the process of the present invention several advantages are achieved, and in particular:

- a high production equal to as least 10 cu.m/hr and generally from 15 to 50 cu.m/hr of desalted water with an apparatus of reduced size;
- a high total efficiency in desalting;
- the possibility, with simple modifications in the connections of the pipes, of obtaining a flexibility of about 100%, always under optimal operating conditions; a fact that can be achieved by excluding a stage, with consequent halfing of the production of soft water;
- an optimum distribution, in whatever charge conditions, being the formation of the film depending on a pool which automatically adjust itself to whatever charge, within a large interval;
- an extreme efficiency of the cooling and condensation system for the uncondensables, ensuring a low content of the latter all over the condensation zone; a fact which favors the obtaining of high heat-exchange coefficients and the absence of corrosion phenomena;
- the possibility of using fluted tubes which find a proper application only in the case that a heat-exchange mechanism with a film falling on the inside of vertical tube is chosen;
- a collecting zone for the distillate removed from the condensation chambers, which avoids any reduction of the heat-exchange surface by formation of a pool in said chambers;
- a liquid-steam separation zone, wherein the particular, lengthened run of the steam and the use of a demister permit a complete elimination of the draggings, with consequent high grade of the steam and absence of corrosion phenomena in the compressor;
- a degassing and chemical conditioning zone, of primary importance for the removal of the corrosive gases carbon dioxide and oxygen.

This latter in particular can be completely removed by addition of a deoxidant which finds the necessary time for reacting in the degassing zone.

Other advantages derive from the fact that the process and the desalting equipment of the present invention, permit of:

- providing an introduction of antiscaling chemical additives in such points as to protect all the equipment and pipes from the soiling and corrosion phenomena;
- determining inlet points and flow junctions which reduce the number of the pumps for liquid present in the plant, to only three;
- obtaining very compact geometries for which a transportation on self propelled means by coupling to diesel motors may be envisaged.

Finally the particular choice of the materials permits a long life time to the plant.

We claim:

1. An apparatus for desalting saline water, which comprises:
   - a vertical elongated tubular shell closed at its upper end by a domed end-wall and at its lower end by a lower header plate (1c);
   - said shell defines together with said end-wall and an upper header plate (1) an upper zone (37) for the feeding and distribution of the saline water to be desalted; said upper zone (37) providing a pool of saline water fed in through a pipe (23);

said shell defines with said upper header plate (1) and an upper intermediate header plate (1a) first evaporation and condensation zones (38); a first bundle of vertical tubes (2) extends through said condensation zone (38), the upper ends of said tubes protruding through said upper head plate (1), being submerged in said pool of said upper zone (37) and being provided with means for flowing in the inside of the tubes (2) saline water in the form of a thin falling film; the lower ends of said tubes (2) protruding through said upper intermediate header plate (1a) in a first separation zone (25) for the separation of vapor from the residual brine; said first condensation zone (38) includes a vertical tubular collector (13) for the uncondensable gases, said collector (13) being foraminous in its lower part, provided on the inside with cooling means and connected at its upper part to a suction equipment;

said first separation zone (25) for the separation of vapor from the brine is defined by said shell, said upper intermediate header plate (1a) and a lower partition plate (44);

said partition plate (44) defines with the shell and a lower intermediate header plate (1b) a lower feeding and distribution zone (39) providing a pool of saline water;

said lower intermediate header plate (1b) defines with said shell and said lower header plate (1c) a second evaporation and condensation zone (40); a second bundle of vertical tubes (2') extends through said second evaporation and condensation zone (40), the upper ends of said second bundle of vertical tubes tubes (2') protruding through said lower intermediate header plate (1b) being submerged in said pool in said lower feeding and distribution zone (39) and being provided with means for flowing in the inside of said tubes (2') saline water in the form of a falling and thin film; the lower ends of said second bundle of vertical tubes tubes (2') protruding through said lower header plate (1c) in a second separation zone (41) for the separation of vapor from the residual brime; said second evaporation and condensation zone (40) includes a vertical tubular collector (13') for the uncondensable gases, said collector (13') being foraminous in its lower part, provided on the inside with cooling means and connected at its upper part to a suction equipment;

said first separation zone (25) and said lower feeding and distribution zone (39) are connected by means of a pipe (24) for delivering said brine collecting in said first separation zone (25) to said pool of said lower feeding and distribution zone (39);

said first and second condensation zones (40) are connected by means of a pipe (28) for delivering the condensate collecting in said first condensation zone (38) to said second condensation zone (40);

said first separation zone (25) and said second condensation zone (40) are connected by means of a pipe (27) for delivering, through a demister (26) housed in the upper part of said first separation zone (25), said vapor recovered in said first separation zone (25) to said second condensation zone (40);

said shell is supported by a base section comprising a horizontal closed-ended vessel having a pair of inner impervious vertical partitions; said partitions define in said vessel a collecting chamber (31) for the condensate at one end of the vessel, a degassing and conditioning chamber (42) for the feeding saline water at the other end of the vessel, and said second separation zone (41) extending between the partitions; the lower portion of said shell protrudes in sealing contact with said vessel into said zone (41);

said second separation zone (41) is connected through an upper aperture with the intake side of a compressor and the delivery side of said compressor is connected to said upper condensation zone (38);

a downcomer tube opens at its upper end through the lower header plate (1c) into said second condensation zone (40) and at its lower end into said condensate collecting chamber (31);

said condensate collecting chamber (31) and said second condensation zone (40) are connected by a conduit (49) for the purpose of equilibrating the pressures therein;

pump means are provided for discharging the condensate from the condensate collecting chamber (32) and other pump means are providing for connecting the bottom region of both said second separating chamber (41) and said degassing and conditioning chamber (42) to said upper feeding zone (37) to thereby deliver to the latter the saline water to be desalted.

2. The apparatus of claim 1, wherein said means at the upper ends of said tubes for delivering saline water in the form of a thin falling film on the inside of tubes comprise a cap (3) sealing by closing the upper end of each of said tubes, from two to four holes being drilled on said cap (3), a tubular stem depending from the cap into the tube, and a frusto-conical roof member depending from the stem, the circumference of the roof member forming with respect to the tube a circumferential gap of a radial size of from 0.5 to 2 mm.

3. The apparatus of claim 1, wherein said tubes are fluted tubes having a nominal diameter of from 50 to 100 mm.

4. The apparatus of claim 1, wherein said tubular, non-condensable gas collectors are on the collinear axis of the corresponding bundles of tubes and are foraminous through a length comprised within the lower half of the height of the relative evaporation zone.

5. The apparatus of claim 1, wherein said cooling means in said respective non-condensable gas collectors comprise a plurality of smooth tubes with a diameter of from 20 to 25 mm and means for flowing cold saline water through said smooth tubes.

6. The apparatus of claim 1, wherein a demister (45) is housed in said upper aperture of the second separating chamber (41).

7. The apparatus of claim 1, wherein said degassing and conditioning chamber (42) is connected to a vacuum system through an upper aperture, cooling means being provided near said upper aperture in said chamber (42) for condensing the vapor sucked by said vacuum system.

* * * * *